Figure 1:
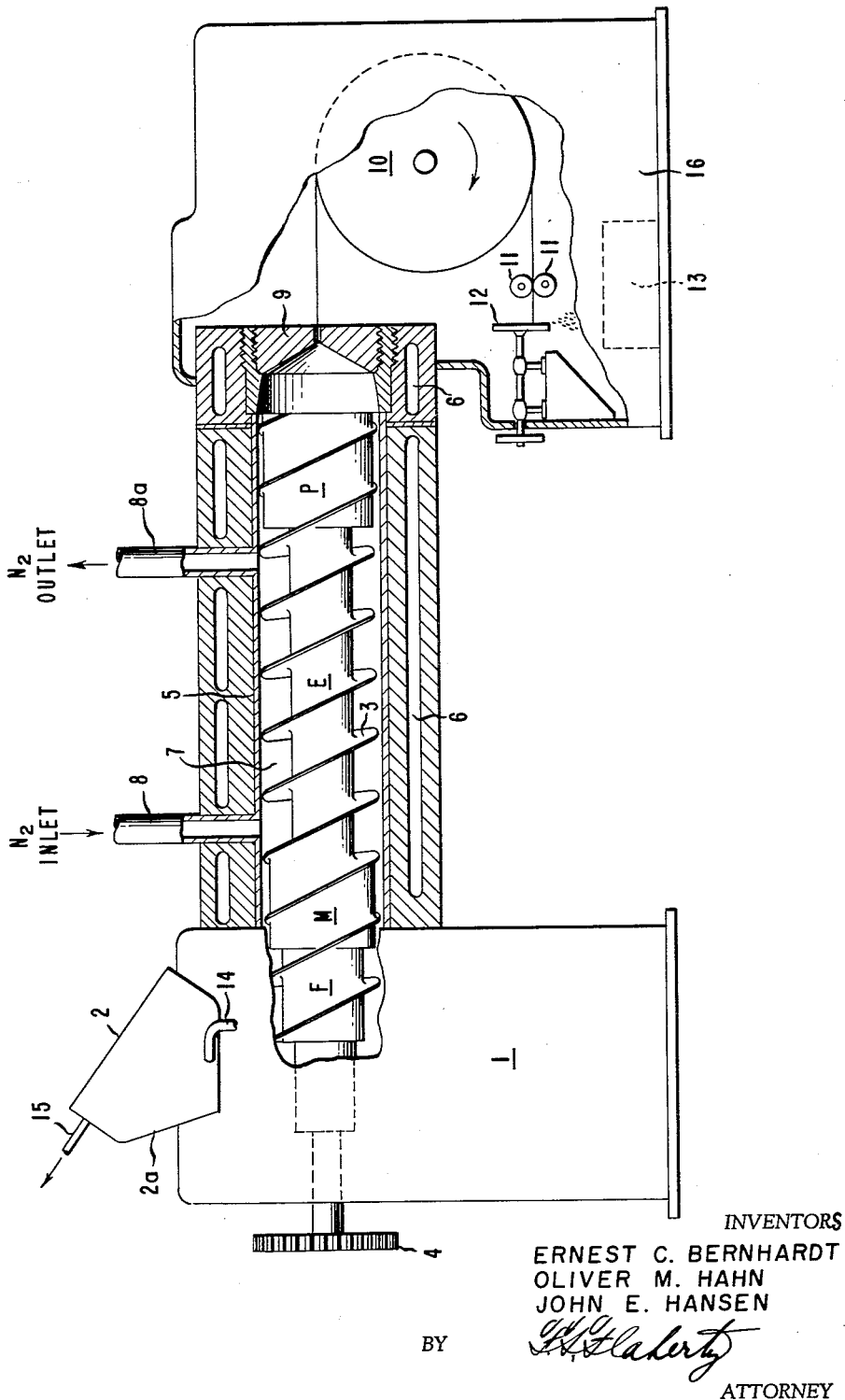
Figure 2:
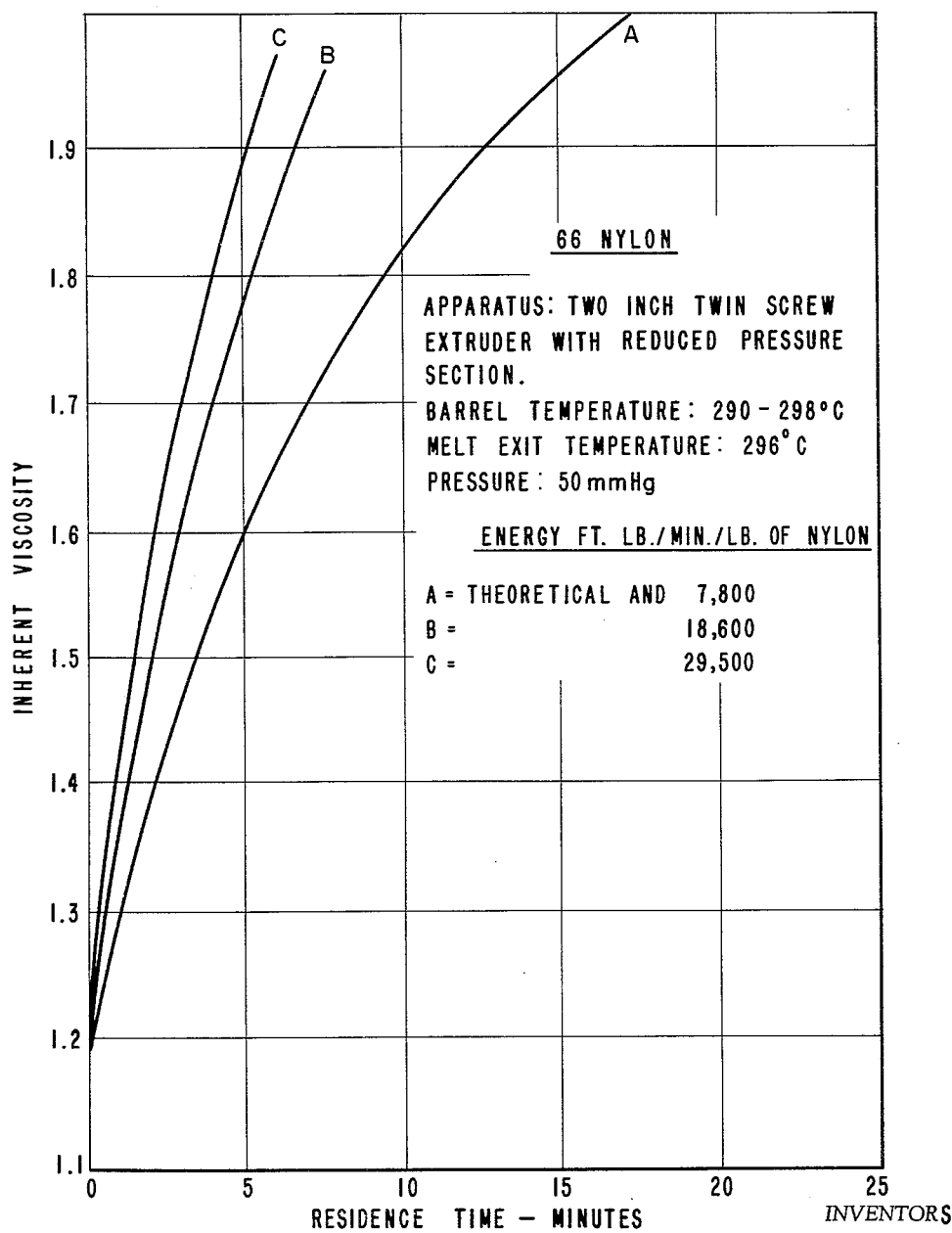

United States Patent Office 3,040,005
Patented June 19, 1962

3,040,005
PROCESS FOR INCREASING THE MOLECULAR WEIGHT OF POLYAMIDES
Ernest Carl Bernhardt, Oliver Martin Hahn, and John Edward Hansen, Wilmington, Del., assignors to E. I. du Pont de Nemours and Company, Wilmington, Del., a corporation of Delaware
Filed Jan. 21, 1959, Ser. No. 788,125
6 Claims. (Cl. 260—78)

This invention relates to a process for the treatment of polyamides and more particularly relates to the reconditioning and melt extrusion of condensed polyamides to give products possessing increased molecular weight and improved physical properties. This application is a continuation-in-part of S.N. 735,062, filed May 13, 1958, which is a continuation-in-part of S.N. 532,081, filed Sept. 1, 1955, now abandoned.

It has been recognized in connection with the extrusion of condensed polyamides into filaments, films and other products that the presence of bubbles of gas, due to decomposition, entrapment from the atmosphere, and the like in, e.g., a molding powder prior to extrusion, is definitely objectionable since such bubbles are carried through the extrusion operations to the formed product causing irregularities in the product as well as unsatisfactory operation of the extruder. Methods have been developed to overcome such conditions. The Graves U.S. Patent 2,278,875, issued April 7, 1942, describes the use of high compression to redissolve the gaseous decomposition products. The R. T. Fields patent, U.S. 2,295,942, issued September 15, 1942, blankets the molten polymer with an inert gas such as carbon dioxide to assist in removing occluded contaminants. These and other investigators were and others are concerned generally with reducing the contaminant content of the polymer to prevent visual imperfections. Their processes, accordingly, while improving the appearance of the extruded products, do not, to a significant extent, alter the chemical form of the polymer.

Attention has also been directed to methods of changing chemically the polyamide molecule. The Flory U.S. Patent 2,172,374, issued September 12, 1939, describes a method by which the molecular weight of polyamides can be increased. He accomplishes this by heating the low molecular weight polymer in the solid phase and below its melting point until the desired increase in molecular weight has been obtained. Other investigators have subjected the formed polyamide products to physical treatment to improve physical properties. The Graves U.S. Patent 2,212,772, issued August 27, 1940, treats melt extruded films, filaments, and the like by rapidly cooling or quenching them as they issue from an extrusion die, while other investigators have provided various fluid baths for setting the product by heat under tension.

The present invention is directed to a process for increasing the molecular weight and improving the properties of polyamides by an extrusion operation and is directed more particularly to converting low molecular weight polyamides having number average molecular weights of less than 25,000 and which are suitable for injection molding to polyamides having higher number average molecular weights which result in melt viscosities high enough for fabrication by extrusion.

An object of the present invention is to provide a melt extrusion process for the treatment of relatively low molecular weight polyamides in which the molecular weight is increased and the physical properties of the polymers are markedly improved. A further object of the invention is to provide a melt extrusion process for increasing the molecular weight of polyamides at a more rapid rate and to a greater extent than has heretofore been possible. Yet another object is to provide a process for producing a superior synthetic linear polyamide of uniform properties from a heterogeneous mixture of polyamides, the component parts of which severally and/or jointly have inferior properties. Other objects and advantages of the invention will appear hereinafter.

The process of the invention is conducted by introducing a polyamide or mixture of polyamides into a suitable melt extruding device that has been adapted and arranged to accomplish the working of the polyamide in a dynamic atmosphere of an inert gas, the working being carried out below, above or at atmospheric pressure, the atmosphere of inert gas being forced to flow with the polyamide through the extruding device at rates such that the volatile products formed during working are rapidly removed from the polyamide. The polymer or mixture of polymers may be charged into the extruder in the form of chips, flakes, pellets, filaments, films, scrap or any other physical form. The extruder screw or similar device compacts the charge which is then heated to the molten state. It is preferable to use equipment with a charging hopper or the like than can be operated under nitrogen, carbon dioxide, or other inert gas environment, in order that entrapped air, oxygen and like undesirable gas may be removed from the charge prior to and/or during its initial melt stage. As the resulting melt is forced into the equipment, it meets working and extracting sections in which the amount of extraction and the degree of mechanical work input, the degree of pressure, the flow rate of inert gas, and the time the melt is in the sections are adjusted to lower the free moisture content of the melt and increase its viscosity by chemical reaction. The resulting melt is then extruded from the molten state through any suitable die to give a shaped product in the solid state, such as a molding powder or pellet, or as a bar, rod, tube, sheet, channel, or any other desired shape which may be produced continuously or discontinuously.

The optimum increase in toughness and molecular weight of an extruded product of the invention, the rate of that increase and the uniformity of the resultant composition is dependent on the energy input during the working of the polymer while it is in the molten state and the extracting action of the inert gas atmosphere. The energy input during working of the polymer by screw feeding devices, malaxators, or the like, and exposure of a large surface of the melt while in contact with the atmosphere of inert gas determine the rate of increase in molecular weight and the completeness of moisture removal and uniformity of product.

The unexpected and unpredictable results obtained by the process of the invention are illustrated by comparisons of the curves B and C with curve A, found on the graph of FIG. II. On the graph are plotted residence times of nylon, prepared from adipic acid and hexamethylenediamine and having an initial inherent viscosity of about 1.2 in a twin screw extruder into which the nylon was introduced at room temperature, and from which the nylon was discharged at about 296° C., the nylon being subjected to a reduced pressure of about 50 mm. of Hg during treatment. The residence time that the said nylon was in the extruder is plotted as the abscissae and the inherent viscosity of the nylon as the ordinates.

The data of curve A are for the very favorable conditions for polymerization, i.e., complete removal of the water of polymerization as rapidly as it is formed, thus eliminating the hydrolysis reaction which is the reverse of the polymerization and resulting in the theoretical maximum rate of polymerization. These data are for polymerization at 290° C. from 0 min. to 15 min. residence time. The rate of polymerization indicated by curve A was not attainable in apparatus heretofore used, such as an extruder or a stirred autoclave, because the water formed in the condensation reaction cannot be removed instantaneously in such apparatus. When the polymerization is carried on in a melt extruder provided with a reduced pressure section and reduced pressure applied to the polymer being worked, the polymerization rate is increased because of the increased rate of water removal. While curve A represents theoretical conditions (at 296° C.), very favorable for the highest rate of viscosity increase, it was found that the curve corresponded to a startling extent with a curve from data obtained by extruding nylon in a twin screw extruder operated at 296° C. polymer discharge temperature, 50 mm. Hg pressure and with an energy input of about 7800 ft. lbs./min./lb. of polymer. The further finding was also wholly unexpected, that increases in mechanical energy input increased the polymerization rate above that obtained when the water produced is removed instantaneously. Moreover, from the comparison of curve B with curve A of the drawing, it is apparent that by increasing the rate of mechanical energy input into the nylon to 18,600 ft. lbs./min./lb. of polymer at least doubles the rate of polymerization predicted as the heretofore unattainable, theoretical maximum rate shown by curve A; at a mechanical energy input of 29,500 ft. lbs./min./lb. of polymer (curve C), the rate of polymerization is at least three times that shown by the heretofore unattainable rate of curve A. The residence times of the graph are the total times that the polymer is in the screw of the extruder and include the time required to heat the solid to the melting point, melt it, and heat the melt beyond the melting point to the processing temperature. Therefore, the average temperature of the polymer is somewhat below the temperature of the melt at the die of the extruder, and if the polymer could be heated instantaneously to the processing temperatures, the amounts of polymerization obtained would be further increased from those shown on curves B and C of FIGURE II. This improved rate cannot be obtained by merely increasing the temperature of an autoclave polymerization process, for to arrive at this rate an autoclave, even when the rate of diffusion of the water of polymerization is assumed to be infinitely rapid, would still have to be operated at about 340° C. which would result in drastic degradation of the polymer to such an extent that it would be of no value for commercial use. Under the assumption of normal conditions of diffusion in an autoclave, the temperature necessary to give these rates would have to be much higher than 340° C. It is not known whether such an increase in temperature occurs even momentarily during the extrusion and the above comparison with autoclave polymerization is not to be construed as limiting the invention in any manner.

In accord with the invention a mixture of polymers may be changed from a valueless product of indefinite composition to a valuable product of definite composition. For example, a mixture of scrap nylon may be treated by the process of the invention. This may have been collected from many sources and be of many varieties containing separate compositions possessing a plurality of physical and chemical properties. The invention converts such a heterogeneous mixture of polymers to a product possessing a comparatively narrow molecular weight range and properties that fit it for many valuable uses. Moreover, the invention makes it possible to increase the inherent viscosity of condensed polyamides to produce polymers having desirable high inherent viscosities, high molecular weights and superior properties.

In this specification and attached claims, inherent viscosity may be used as a measure of the physical as well as chemical changes of the polyamide resulting from the process of the invention. This viscosity is determined by preparing a solution of the polymer in meta-cresol, measuring the relative viscosity of that solution against meta-cresol containing no polymer, and from that relative viscosity, determining the inherent viscosity. More specifically, 50 ml. of a meta-cresol solution containing 0.25 gram of the polymer is prepared and its viscosity determined in a suitable viscosometer. The viscosity of meta-cresol containing no polymer is likewise determined at the same temperature, 25° C., and the ratio of viscosity of the polymer-containing meta-cresol to the non-polymer-containing meta-cresol determined. The inherent viscosity is calculated from this relative viscosity value by this formula:

Inherent viscosity $(N_{inh})$ $$= \frac{\ln \text{ of relative viscosity}}{0.5} (N_{rel})$$

The process of the invention is effective for not only increasing the inherent viscosity of polyamides of relatively low inherent viscosity, such as scrap nylon and other polyamides of inferior grade and/or low viscosity by an incremental increase of at least 0.10 and preferably of at least 0.30, but can be used for increasing the viscosity of polyamides having an intial inherent viscosity below 1.4 to over 1.4, and suitably up to 1.6 to 1.85 or higher. Such viscosity increases are measures of the extent of improved properties that have been realized. Improved molecular weight, tensile strength, stiffness, toughness, etc. occur simultaneously with inherent viscosity increase.

The degree of vacuum employed during extrusion determines, inter alia, the amount of polymerization which can take place. When polymerizing at 290° C. to inherent viscosities above 1.6, the pressure should be as low as possible in the range of 20–100 mm. of Hg absolute. For inherent viscosities in the range 1.2–1.4, pressures of 200–400 mm. of Hg absolute are sufficiently low to represent no hindrance to removal of water as formed during working. At temperatures below 290° C. lower pressures will be required for comparable polymerization rates to offset the lower vapor pressures of water above the molten polymer. Temperatures of operation should be between the melting point and the point at which the thermal decomposition becomes appreciable, with the range 275–325° C. preferred.

The invention will be more fully understood by reference to the drawing, FIG. 1, which illustrates diagrammatically and in partial cutaway section, an extruder provided with a reduced pressure section. The extruder has a supporting member 1, feed hopper 2 with air tight door 2a and means for purging gases from the feed in the hopper such as inlet gas pipe 14 and exit gas pipe 15. A feed and pressure screw 3, operated through gear 4, by a prime mover, not shown, is positioned in a central housing 5 of the extruder. The screw housing 5 is surrounded by a hollow jacket 6 with a reduced pressure section 7, an inert gas inlet 8 and exit 8a, a vacuum pump, not shown, being connected to the reduced pressure section 7 of the extruding device through exit 8a. At the exit end of the extruder, a suitable die 9 is removably fixed for shaping the product. The extrusion die 9 produces spaghetti-like strands of the polymer. In front of the die a rotating drum 10 is positioned, the surface of which is cooled by suitable means below the solidification point of the condensed polyamide. Guide rollers 11 and rotating cutter knife 12 are situated in front of the guide rollers 11 and opposite their nip. Below the cutter knife 12 is a receiver 13.

The condensed polyamide to be treated is fed into the hopper 2, occluded gases are swept from the polyamide in the hopper 2 by a stream of nitrogen passing into the hopper through inlet pipe 14 and from the hopper through exit pipe 15. The rotating screw 3 extends to a feed chamber situated below the hopper 2, picks up the polymer from below the hopper 2, compacts it in feed section F, forces it into metering section M and into the extraction section E of the extruder. Sufficient heat is supplied by any suitable means, such as a circulating heating liquid, to raise the temperature of the polyamide in the screw chamber to above its melt temperature. The polymer is compacted, metered and forced forward by screw 3. As the polymer passes into the extracting section E, occluded gases and moisture initially present or formed, in situ, are removed by virtue of the flow of inert gas entering that section through inlet 8 and leave the extracting section E through exit 8a. While in section E the exposure of fresh surfaces of the molten polymer to the sweeping action of the inert gas in contact with it induces rapid polymerization. If desired, two or more intermeshing screws may be located in this part of the extruder, such as are shown in the Fuller patent, U.S. 2,615,199, issued October 28, 1952, to insure greater surface exposure for optimum gas purging and moisture removal. As the molten polymer, substantially gas and moisture free, is forced from the extracting section E of the extruder into the pressure section P and die 9, the polymer is formed as a series of strands by the die 9. As the strands issue from the die 9 in the form of continuous cylinders with small diameters, they are picked up on the rotating drum 10, solidified by the surface of the drum 10, cooled to about 50° C. by the coolant circulating within the drum and passed from the drum surface through powered pick-up rolls 11. As the strands issue from the nip of the pick-up rolls 11, a rotating fly knife 12 cuts them off and they drop into the receiver 13. This receiver is surrounded by compartment 16, sealed from moisture. When the receiver 13 has been fully charged, it is hermetically sealed by a suitable cover, not shown, and replaced by an empty receiver.

The section between the die and the receiver may be adapted and arranged for cooling the pellets as they drop into the receiver. This may constitute a housing of considerable length surrounded by a cooling medium or, alternatively, an inert cooled gas may be passed co-current or counter-current through the housing to cool the pellets as they fall into the receiver.

Any suitable material-treating apparatus that combines plastic extrusion with melting and reduced pressure treatment during working can be used in the process of this invention, such as the apparatus described in U.S. Patents 2,615,199, issued 10-28-52, and 2,774,105, issued 12-18-56, and similar extrusion apparatus.

It has been previously shown in the copending application of Bernhardt and Hansen S.N. 735,062, filed May 13, 1958, that vacuum extraction, to remove water from 66 nylon melt during extrusion, is an effective method for increasing the molecular weight of 66 nylon. We have now found that a further unexpected increase in molecular weight can be obtained by using an inert gas, such as nitrogen to extract water during the melt extrusion of polyamides.

and possessing a feed section F which picks up melted polymer from the grid; a metering section M which compresses the melt from the feed section, measures and delivers it to the extraction zone; an extraction section E which permits the polymer to expand and release gases present in the melt; and a pressure section P which delivers molten polymer from the latter section to the die. The barrel of the extruder is equipped, as is the extruder of the drawing, with two inert gas ports 8 and 8a, one at either end of the extraction zone, an inlet port 8 being adjacent to the metering section, and outlet port 8a being adjacent to the pressure section P.

The process of the invention is illustrated by the following examples which employ conventional types of melt extrusion devices provided with means for drawing a reduced pressure on and/or inert gas over the molten polymer during the working of the polymer and prior to its extrusion from the extruder die.

*Example I.*—A melt extruder provided with a reduced pressure section and a main bore of 3¼ inches is fitted with a spaghetti die. The reduced pressure section is provided through the use of a vacuum extruder screw as described. The strands of polymer, as they are forced from the die, are cooled, cut by a cutter and caught in a collector. With a screw speed of about 10 r.p.m. and a barrel temperature of the extruder ranging between 480° F. and 540° F., a nylon molding powder having a moisture content of 0.3% and a relative viscosity of 52 (inherent viscosity of 1.24) is brought up to melt temperature, subjected to the reduced pressure, discharged through the die, pelleted by the cutter and caught in the collector. The extruder is operated at about 40 pounds throughput per hour, and the vacuum drawn on the molten polymer within the extruder is approximately 27 inches of mercury. At the aforesaid throughput, the moisture content of the polymer in the extruder is reduced and the pellets in the collector will have a moisture content of about 0.03% and a relative viscosity of 68 (inherent viscosity of 1.34). Residence time is about 1 minute.

*Example II.*—The process of Example I is repeated with a mixture of polyamide scrap collected from various sources having different physical and chemical properties. This mixture, after vacuum extrusion, will produce a unitary product having an average molecular weight of 16,400 and an inherent viscosity of 1.2.

The table which follows gives the properties of polymers as treated by the vacuum extrusion process of the invention. In such example, the overall properties of the polymer are improved.

TABLE I

| Example | Viscosity Before Treatment | | | Extruder | | Viscosity of Product | | |
|---|---|---|---|---|---|---|---|---|
| | $N_{rel}$ | $N_{inh}$ | Mol. Wt. | Temp., ° C. | Time in min. | $N_{rel}$ (increase) | $N_{rel}$ | $N_{inh}$ | Mol. Wt. |
| III [1] | 45 | 1.2 | 16,400 | 270 | 1 | +10 | 55 | 1.26 | 17,500 |
| IV [1] | 45 | 1.2 | 16,400 | 270 | 5 | +30 | 85 | 1.44 | 21,600 |
| V [1] | 45 | 1.2 | 16,400 | 315 | 1 | +15 | 60 | 1.30 | 18,400 |
| VI [2] | 30 | 1.05 | 13,500 | 290 | 1 | +20 | 50 | 1.23 | 16,700 |
| VII [2] | 30 | 1.05 | 13,500 | 290 | 5 | +35 | 65 | 1.33 | [3] 19,000 |

[1] Molding powder scrap.
[2] Yarn scrap.
[3] Autoclave polymerization under reduced pressure and at 290° C. requires 14 minutes to reach same mol. wt.

A dynamic inert gas purge offers the additional advantage of excluding air, thereby reducing color formation in the polyamide extrudate. Inert gas flow rate can be conveniently adjusted to regulate the increase in molecular weight of the extrudate. The data for the examples shown below were obtained by treatment of polyamide in a 1½ inch diameter screw extruder except where specifically designated otherwise. The screw in this unit consists of four sections similar to those of the drawing As discharged from the extruder the products have a reduced moisture content, improved properties and higher molecular weight.

The input energy was calculated in accord with the equations of R. S. Mallouk et al. in their article on "Power Requirement of Melt Extruders," Ind. Eng. Chem., vol. 45, p. 988, May 1953, using these viscosity values—Mu 0.16 lb. sec./sq. in. and $Mu_L$ 0.08 lb. sec./sq. in.

*Example III.*—Using the extruder just described and starting with a polyamide (66 nylon) containing 0.12% sodium hypophosphite and having a molecular weight ($\overline{M}_n$) of 19,000, it was found that by closing the inlet port 8 and opening the outlet port 8a to the atmosphere, the molecular weight of the extrudate from the extruder remained the same (19,000) as the polymer introduced into the extruder. The application of vacuum to the outlet port to remove water from the polymer melt, increased the molecular weight of the extrudate to 32,000. By bleeding nitrogen into the inlet port and discharging it through the extraction zone and then the outlet port, the nitrogen being introduced at a pressure of about 2 p.s.i.g., the molecular weight of the extrudate was increased to 32,000. However, the color formed in the extrudate prepared with nitrogen extraction was considerably less than the color in the extrudate prepared with vacuum extraction. The operating conditions in each of these (Ex. III) tests were essentially the same and are shown in the Table II.

TABLE II

| Cylinder Rear, °C. | Temp. Front, °C. | Screw Speed, r.p.m. | Through put, lb./hr. | Residence Time, min. | Screw Power Input Ft.-lb./lb.-min. | Extrudate Molecular Weight ($\overline{M}_n$) |
|---|---|---|---|---|---|---|
| (A) 296 | 292 | 17 | 5.0 | 3.5 | 7,200 | 19,000 |
| (B) 295 | 296 | 17 | 4.1 | 4.2 | 7,200 | 32,000 |
| (C) 293 | 290 | 15.5 | 4.1 | 4.2 | 6,100 | 32,000 |

(A)—Inlet Port Closed, Outlet Port open to atmosphere.
(B)—23.3 inches vacuum applied to outlet port.
(C)—Nitrogen bleed through the extraction zone, pressure 2 p.s.i.g.

*Example IV.*—Using the extruder described in Example III and starting with a 66 nylon having a molecular weight ($\overline{M}_n$) of 19,000, the molecular weight of the extrudate was regulated by adjusting the nitrogen flow rate as shown in Table III.

TABLE III

| Cylinder Rear, °C. | Temp. Front, °C. | Screw Speed, r.p.m. | Through put, lb./hr. | Residence Time, min. | Screw Power Input Ft.-lb./lb.-min. | Nitrogen Flow Rate, Ft.³/min. | Extrudate Molecular Weight ($\overline{M}_n$) |
|---|---|---|---|---|---|---|---|
| 302 | 299 | 26 | 2.7 | 6.4 | 17,000 | 0.21 | 29,500 |
| 302 | 299 | 26 | 2.9 | 6.0 | 17,000 | 0.42 | 33,500 |
| 302 | 299 | 26 | 2.5 | 7.0 | 17,000 | 0.62 | 34,000 |
| 302 | 299 | 26 | 2.1 | 8.3 | 17,000 | 0.76 | 39,000 |

The process of the invention is effective for polyamides that do or do not contain polymerization accelerators. With such accelerators present to the extent of from 0.05 to 1.0% by weight of the polymer, the rate of polymerization is increased. Examples of such accelerators are sodium hypophosphite, phosphoric acid and other acidic non-volatile organic and/or inorganic compounds.

The invention is particularly adapted for the treatment of condensed polyamides generally such, for example, as those produced by the processes of the Carothers' patents, U.S. 2,071,250, 2,130,523, 2,130,948, etc. and by the condensation of the aminocarboxylic acids, such as caprolactam and the like, to homopolymers, and particularly those polymers that have been used and are in the form of scrap, for example. Any low molecular weight polymer having a repeating group consisting almost entirely of $$\begin{array}{c} \text{H} \quad \text{O} \\ | \quad \| \\ -\text{N}-\text{C}- \end{array}$$

units, linked together by divalent saturated acyclic hydrocarbon radicals, containing a chain of at least 4 carbon atoms as an integral part of the chain, can be treated in accord with the invention without departing from its scope. Examples of the more important commercial nylons that can be treated in accord with the invention are those obtained from the condensation of hexamethylene diamine with adipic acid 66, or with sebacic acid 610, or polyepsilon caprolactam 6, or copolymers in any desired ratio of any two of the polymers, 6, 66, and 610, or any desired ratio of all three polymers.

In accord with the invention very high molecular weight polymers can be prepared which cannot be produced in melt polymerization apparatus of the art. These polymers are of particular value as materials for extrusion purposes. Furthermore, a mixture of polymers can be changed from a valueless product of indefinite composition to a valuable product of definite composition.

We claim:
1. In a process for increasing the inherent viscosity of condensed polyamides having, in their molecular structure, a repeating group conforming with this formula

$$\begin{array}{c} \text{H} \quad \text{O} \\ | \quad \| \\ -\text{N}-\text{C}- \end{array}$$

linked together by divalent saturated acyclic hydrocarbon radicals containing a chain of at least 4 carbon atoms as an integral part of the chain, the step which comprises mechanically working at a mechanical energy input of at least 7,800 ft. lbs./min./lb. of polyamide, a polyamide having said repeating structure in an inert atmosphere until the inherent viscosity of the polyamide has been increased by an increment of at least 0.10.

2. The process of claim 1 in which the polyamide is subjected to a reduced pressure, during the working operation.

3. In a process for increasing the inherent viscosity of condensed polyamides having, in their molecular structure, a repeating group conforming with this formula $$\begin{array}{c} \text{H} \quad \text{O} \\ | \quad \| \\ -\text{N}-\text{C}- \end{array}$$

linked together by divalent saturated acyclic hydrocarbon radicals containing a chain of at least 4 carbon atoms as an integral part of the chain, the steps which comprise increasing the inherent viscosity of a polyamide having said structure from less than 1.4 to at least 1.6, by charging the polyamide having an inherent viscosity of less than 1.4 into a melt extruder provided with a feed pressure screw, heating the polyamide to the molten state and subjecting the polyamide to a mechanical working operation by the action of the screw, at a mechanical energy input of at least 7,800 ft. lb./min./lb. of the polyamide, while passing nitrogen over the polyamide during the working operation.

4. The process of claim 1 in which the polyamide is a polymer of hexamethyleneadipamide.

5. The process of claim 1 in which the inert atmosphere is produced by introducing an inert gas.

6. The process of claim 1 in which the inert atmosphere is produced by reducing the atmospheric pressure.

References Cited in the file of this patent
UNITED STATES PATENTS

| 2,172,374 | Flory | Sept. 12, 1939 |
| 2,190,770 | Carothers | Sept. 20, 1940 |
| 2,557,808 | Walker | June 19, 1951 |

FOREIGN PATENTS

| 248,484 | Switzerland | Mar. 16, 1948 |
| 1,157,885 | France | Jan. 6, 1958 |